(12) United States Patent
Mire et al.

(10) Patent No.: US 9,217,314 B2
(45) Date of Patent: *Dec. 22, 2015

(54) METHOD AND APPARATUS FOR EVACUATING HYDROCARBONS FROM A DISTRESSED WELL

(75) Inventors: Michael Mire, Kenner, LA (US); Joey Naquin, Houma, LA (US)

(73) Assignee: GULFSTREAM SERVICES, INC., Houma, LA (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/882,387

(22) PCT Filed: Oct. 28, 2011

(86) PCT No.: PCT/US2011/058357
§ 371 (c)(1),
(2), (4) Date: Sep. 26, 2013

(87) PCT Pub. No.: WO2012/058574
PCT Pub. Date: May 3, 2012

(65) Prior Publication Data
US 2014/0008077 A1    Jan. 9, 2014

Related U.S. Application Data

(60) Provisional application No. 61/407,779, filed on Oct. 28, 2010.

(51) Int. Cl.
*E21B 7/12*    (2006.01)
*E21B 41/00*    (2006.01)
(Continued)

(52) U.S. Cl.
CPC ............. *E21B 41/0007* (2013.01); *E21B 17/01* (2013.01); *E21B 19/002* (2013.01);
(Continued)

(58) Field of Classification Search
CPC ... E21B 43/01; E21B 43/0122; E21B 43/013; E21B 33/035; E21B 33/064; E21B 33/076
USPC ................. 166/368, 344, 345, 351, 363, 364; 137/15.12, 15.15, 317
See application file for complete search history.

(56) References Cited

U.S. PATENT DOCUMENTS 4,336,843 A    6/1982  Petty
8,997,841 B2 *  4/2015  Dawson ........................ 165/166

FOREIGN PATENT DOCUMENTS

WO    WO 82-01387    4/1982
WO    WO 93-11305    6/1993
WO    WO 2005-038145    4/2005

*Primary Examiner* — Matthew Buck
*Assistant Examiner* — Patrick Lambe
(74) *Attorney, Agent, or Firm* — Garvey, Smith, Nehrbass & North, L.L.C.; Charles C. Garvey, Jr.; Vanessa M. D'Souza

(57) ABSTRACT

A method of evacuating hydrocarbons from a plurality of nested tubulars of a well pipe that extends from an underwater well tree includes an initial step of attaching a fluid transmission line to the underwater well tree, the fluid transmission line having one end portion forming the attachment to the tree and the other end portion attached to a pump that forces fluid under pressure to the tree and attached nested tubulars. Openings are formed through one or more tubulars of the nested tubulars at a selected location. A specially configured fitting is attached to the tubulars. The fitting seals the openings. The fitting has an expandable seal that is expandable responsive to rotation of a rotating member that rotates upon a saddle, pulling a tapered mandrel against the seal. The saddle surrounds the mandrel and bears against an outer tubular of the nested tubulars. The fitting mandrel has a bore. Hydrocarbons escape from the tubulars via the mandrel bore.

24 Claims, 9 Drawing Sheets

(51) Int. Cl.
    E21B 43/01      (2006.01)
    F16L 9/19       (2006.01)
    F16L 41/08      (2006.01)
    E21B 33/035     (2006.01)
    E21B 17/01      (2006.01)
    E21B 19/00      (2006.01)

(52) U.S. Cl.
    CPC ............... *E21B33/035* (2013.01); *E21B 43/01*
                (2013.01); *E21B 43/0107* (2013.01); *F16L 9/19*
                       (2013.01); *F16L 41/088* (2013.01)

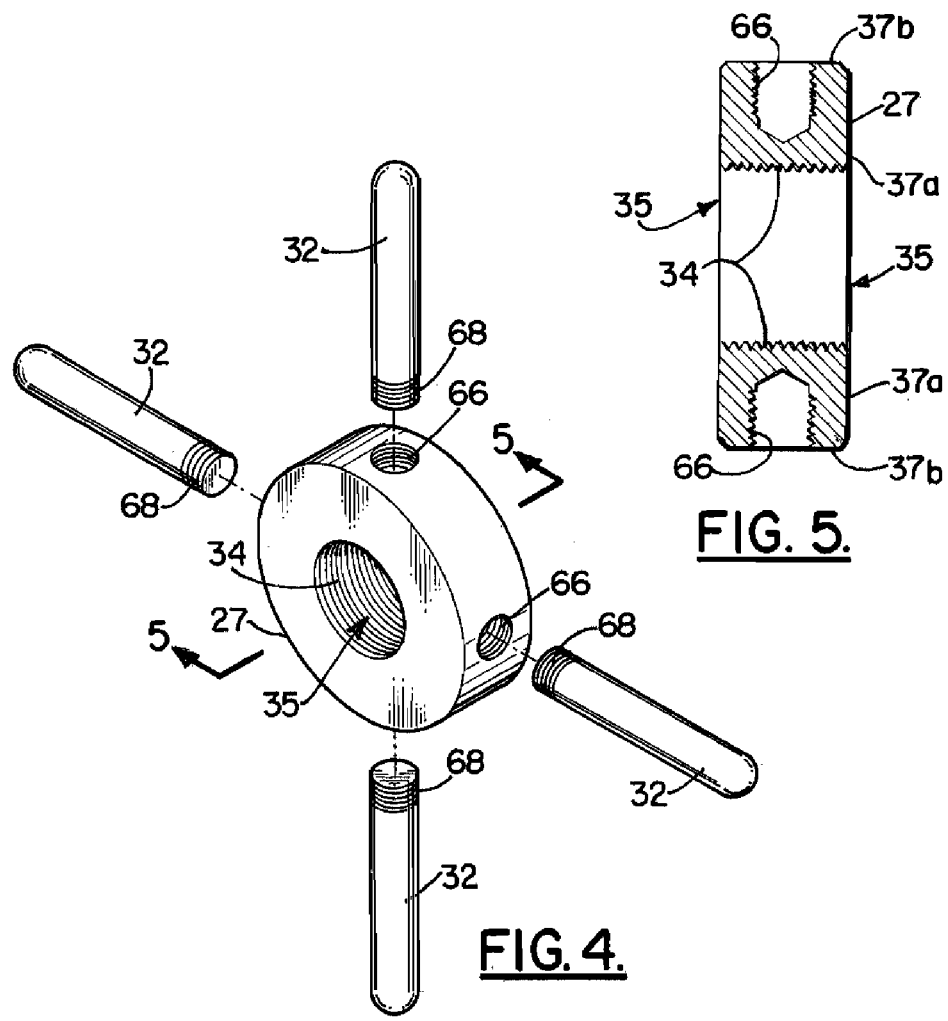
FIG. 4.
FIG. 5.
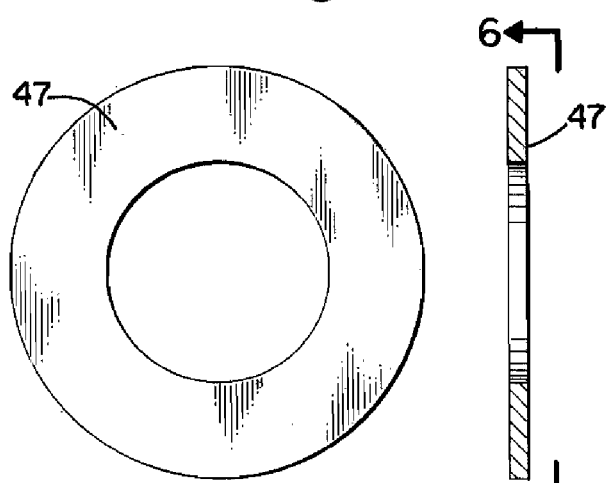
FIG. 6.
FIG. 7.

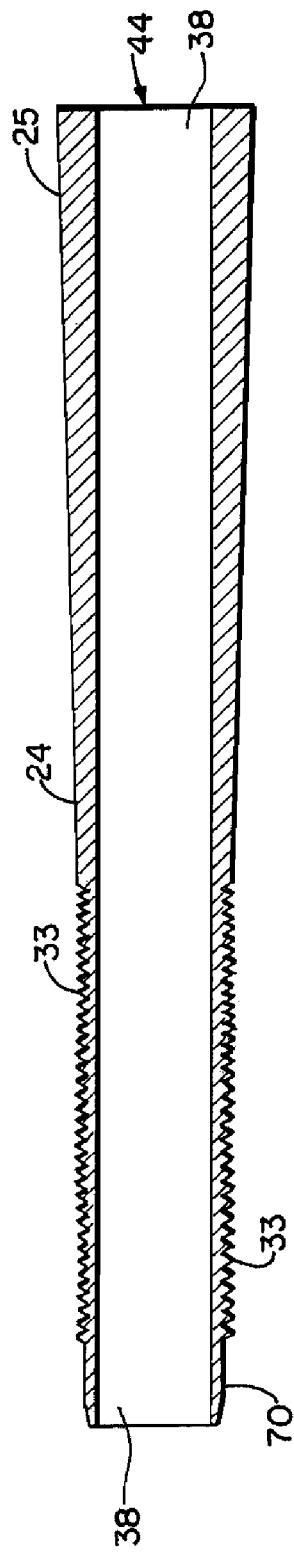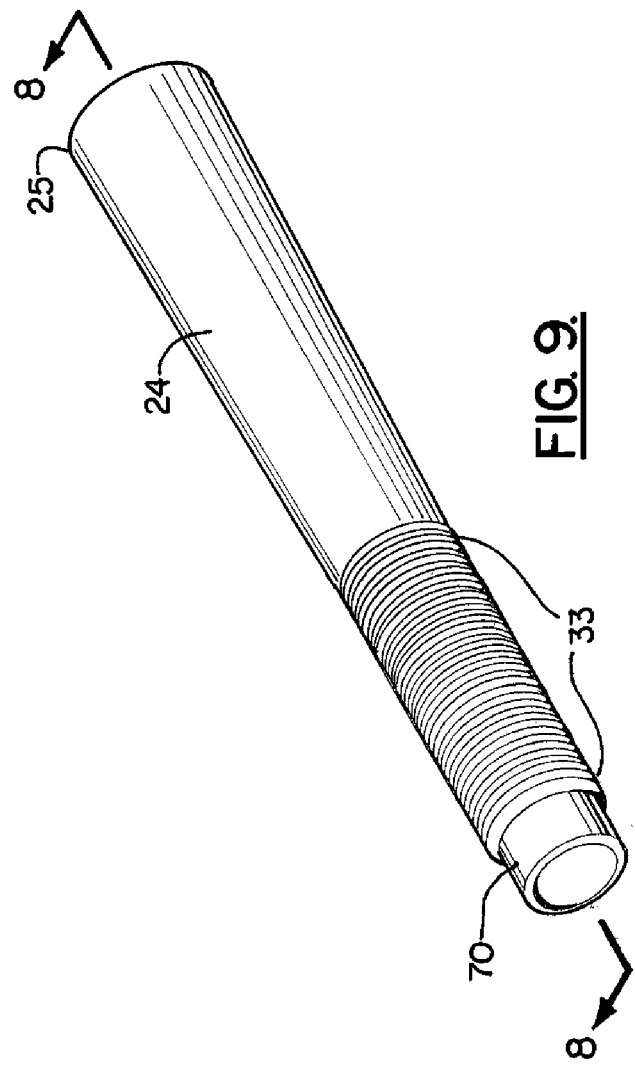
FIG. 8.
FIG. 9.

METHOD AND APPARATUS FOR EVACUATING HYDROCARBONS FROM A DISTRESSED WELL

CROSS-REFERENCE TO RELATED APPLICATIONS

This is a non provisional patent application of U.S. Provisional Patent Application Ser. No. 61/407,779, filed 28 Oct. 2010.

Priority of U.S. Provisional Patent Application Ser. No. 61/407,779, filed 28 Oct. 2010, hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for evacuating hydrocarbons from a distressed or damaged oil well (or oil and gas well) such as a hurricane or storm damaged oil well. More particularly, the present invention relates to a method and apparatus for evacuating hydrocarbons from a distressed or damaged well wherein a specially configured ported plug apparatus seals all strings of exterior casing but provides an orifice to the casing string which holds the production tubing, and wherein the plug can hold excessive pressure, enabling injection through a well tree or crown valve to force the hydrocarbons up through the plug and back to the surface in a safe and controlled process.

2. General Background of the Invention

After tropical storms such as hurricanes, wells can sometimes be damaged to the point where they must be "killed" or shut in. At times, these wells are tilted over or moved to a generally horizontal position as a result of wind and/or wave action. These damaged wells must be killed as they are sometimes active producers of hydrocarbons which can cause leakage, spillage or other environmental problems. These damaged wells typically will have some form of hydrocarbon material trapped in the production tubing and/or in the casing which can be grouted, un-grouted or multi-grouted.

These trapped hydrocarbons must be evacuated from the well before the well "kill" and/or related plug and abandonment operations can take place. Traditionally, the evacuation of hydrocarbons from such a damaged or distressed well is performed by drilling a hole through all of the casing strings to a position next to the production string. A fitting such as a nipple or collar is fitted to the pipe, sometimes under a small pollution dome. A hose is attached to the pollution dome for enabling migration of the oil or hydrocarbons up to the water. Because the oil is lighter than seawater, the oil migrates out of the drilled pipes and back to the surface. This prior art procedure can sometimes take a long period of time such as, for example, about three to four (3-4) days with added expense.

BRIEF SUMMARY OF THE INVENTION

The present invention is an improved method and apparatus for evacuating hydrocarbons from a distressed or damaged well in an underwater or undersea environment. The apparatus provides a ported plug apparatus which will enter a drilled hole. The ported plug apparatus will seal off all casing strings of the exterior casing but have an orifice that is "open ended" to the casing string which holds the production tubing. On the exterior there can be a quick union such as a Bowen Quick Union (BQU). A hose communicates between the surface area and the plug.

The plug can hold high pressures (e.g. 5,000 psi (34,474 kPa)) upon installation. The ported plug apparatus allows the injection of pressure through a tree or crown valve. This injection of pressured fluid forces the oil up through the specially configured ported plug apparatus of the present invention and back to the surface in a controlled process.

With the method and apparatus of the present invention, hydrocarbons can be moved in a matter of hours (for example, about three to four (3-4) hours) as opposed to days (for example, three to four (3-4) days). With the method and apparatus of the present invention, pressurized fluid can be pumped through the tubing and take returns (hydrocarbons) through the specially configured ported plug apparatus. If there is no communication, and in a gas lift well, the fluid is pumped through the specially configured plug and takes return through the tubing. In either case, the well is rendered free of hydrocarbons and effectively killed.

A benefit of the method and apparatus of the present invention is that if the production tubing has a positive pressure, a commercially available hot tap tool can be connected to the quick union or Bowen Quick Union or BQU to the specially configured ported expandable plug. The production tubing can then be drilled into using the hot tap tool to relieve the pressure.

The inner production tubing can be surrounded by multiple layers of casing such as for example, seven inch (7") (17.78 cm) casing (production casing), 13⅜ inch (33.97 cm) casing, or any other casing. These layers of casing can vary between about seven (7) inches (17.78 cm) and thirty (30) inches (76.2 cm) as examples. Further, the well could provide intermediate production strings.

With the method and apparatus of the present invention, hydrocarbons can be evacuated so that the well can be cut below the mud line to conform to federal safety standards. The method and apparatus of the present invention saves hundreds of thousands of dollars in repair costs because the prior art method typically involves three (3) or four (4) days at between about $100,000-$200,000 per day of repair expense (including personnel, equipment, and supplies).

The present invention includes a method of evacuating hydrocarbons from a plurality of nested tubulars of an underwater well pipe extending from an underwater well tree, comprising steps of a) attaching a first fluid transmission line to the underwater well tree, the fluid transmission line having one end portion forming an attachment to the tree and the other end portion attached to a pump that enables transmission of fluid under pressure to the tree and nested tubulars attached to the tree, b) forming openings through one or more tubulars of the nested tubulars at a selected location, c) attaching to the tubulars a fitting that seals the openings, the fitting having an expandable seal that is expandable responsive to rotation of a rotating member that rotates upon a saddle, the saddle surrounding a mandrel and bearing against an outer tubular of the nested tubulars, d) wherein the fitting has a bore and enabling hydrocarbons to escape from the tubulars via the bore, and e) transmitting the escaping hydrocarbons of step "d" to a collection vessel using a second fluid transmission line.

Preferably, the fitting surrounds the mandrel and in step "c" the mandrel has a tapered section that slides relative to the seal.

Preferably, the mandrel has an externally threaded portion and the rotating member is an internally threaded nut that engages said externally threaded portion of the mandrel.

Preferably, the threaded nut has one or more handles and step "c" includes rotating the nut by rotating one or more handles.

Preferably, the nested tubulars include a production flow line.

Preferably, the nested tubulars include one or more casing sections surrounding the production flow line.

Preferably, in step "c" the fitting has a flow bore and a flow opening through which pressurized fluids can flow and wherein the seal contains pressurized fluid up to about 5,000 p.s.i. (34,474 kPa).

Preferably, the seal is of a rubber or rubber like material.

Preferably, the nested tubulars include a central production flow line, a first casing surrounding the production flow line and a second casing surrounding the first casing and wherein there is a first annulus in between the production flow line and the first casing and a second annulus in between the first casing and the second casing, wherein each annulus is pressurized in steps "d" and "e".

The present invention includes a method of evacuating hydrocarbons from a damaged assembly of nested tubulars and an underwater well tree of an underwater oil well, comprising steps of a) attaching a fluid transmission line to the underwater well tree, the fluid transmission line having one end portion forming said attachment to the tree and the other end portion attached to a pump that enables a working fluid under pressure to be transmitted to the assembly of tree and nested tubulars, b) forming openings through one or more tubulars of the nested tubulars at a selected location, c) attaching to the tubulars a fitting that seals the openings, said fitting having a flow bore, d) wherein in steps "a" and "c", hydrocarbons escape from the tubulars via the bore as the working fluid is pumped to the assembly of tree and nested tubulars.

Preferably, the fitting includes a tapered mandrel and a seal member, and wherein in step "c" the tapered mandrel expands the seal member to seal said openings.

Preferably, the mandrel has a bore and in step "d" the hydrocarbons exit via the mandrel bore.

Preferably, the invention further comprises providing a storage tank and transmitting the hydrocarbons to the storage tank via a flow line that connects between the fitting and the storage tank.

Preferably, the invention further comprises providing a vessel and in step "a" the pump is on the vessel.

Preferably, the invention further comprises providing a vessel and the storage tank is on the vessel.

Preferably, the fitting surrounds the mandrel and in step "c" the mandrel has a tapered section that moves relative to the seal.

Preferably, the mandrel has an externally threaded portion and a rotating member is an internally threaded nut that engages said externally threaded portion of the mandrel.

Preferably, the threaded nut has one or more handles and step "c" includes rotating the nut by rotating one or more handles.

Preferably, the nested tubulars include a production flow line.

Preferably, the nested tubulars include multiple casing sections surrounding the production flow line.

Preferably, in step "c" the fitting has a flow bore and a flow opening through which pressurized fluids can flow and wherein the seal contains pressurized fluid up to about 5,000 p.s.i. (34,474 kPa).

Preferably, in step "d" a return flow line transmits the escaping hydrocarbons to a collection tank.

Preferably, the nested tubulars include a central production flow line, a first casing surrounding the production flow line and a second casing surrounding the first casing and wherein there is a first annulus in between the production flow line and the first casing and a second annulus in between the first casing and the second casing, wherein each annulus is pressurized in step "d".

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a partial perspective view of a preferred embodiment of the apparatus of the present invention;

FIG. 5 is a sectional view taken along lines 5-5 of FIG. 4;

FIG. 6 is a partial perspective view of a preferred embodiment of the apparatus of the present invention;

FIG. 7 is a partial sectional view of a preferred embodiment of the apparatus of the present invention;

FIG. 8 is a partial sectional view of a preferred embodiment of the apparatus of the present invention;

FIG. 9 is a partial perspective view of a preferred embodiment of the apparatus of the present invention;

DETAILED DESCRIPTION OF THE INVENTION

Figure 15:
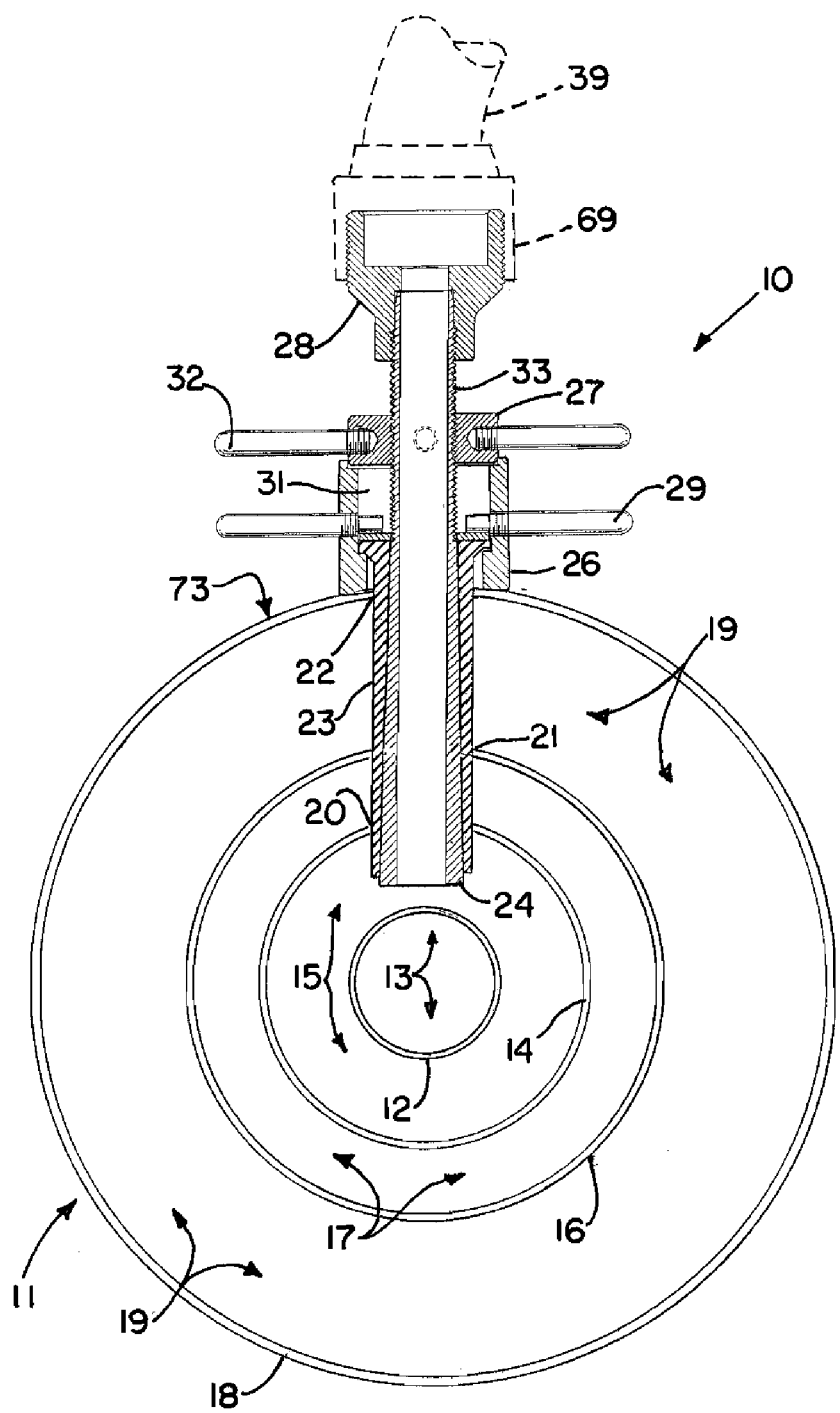
FIG. 15 is an overall sectional view of a preferred embodiment of the apparatus of the present invention.
Figure 16:
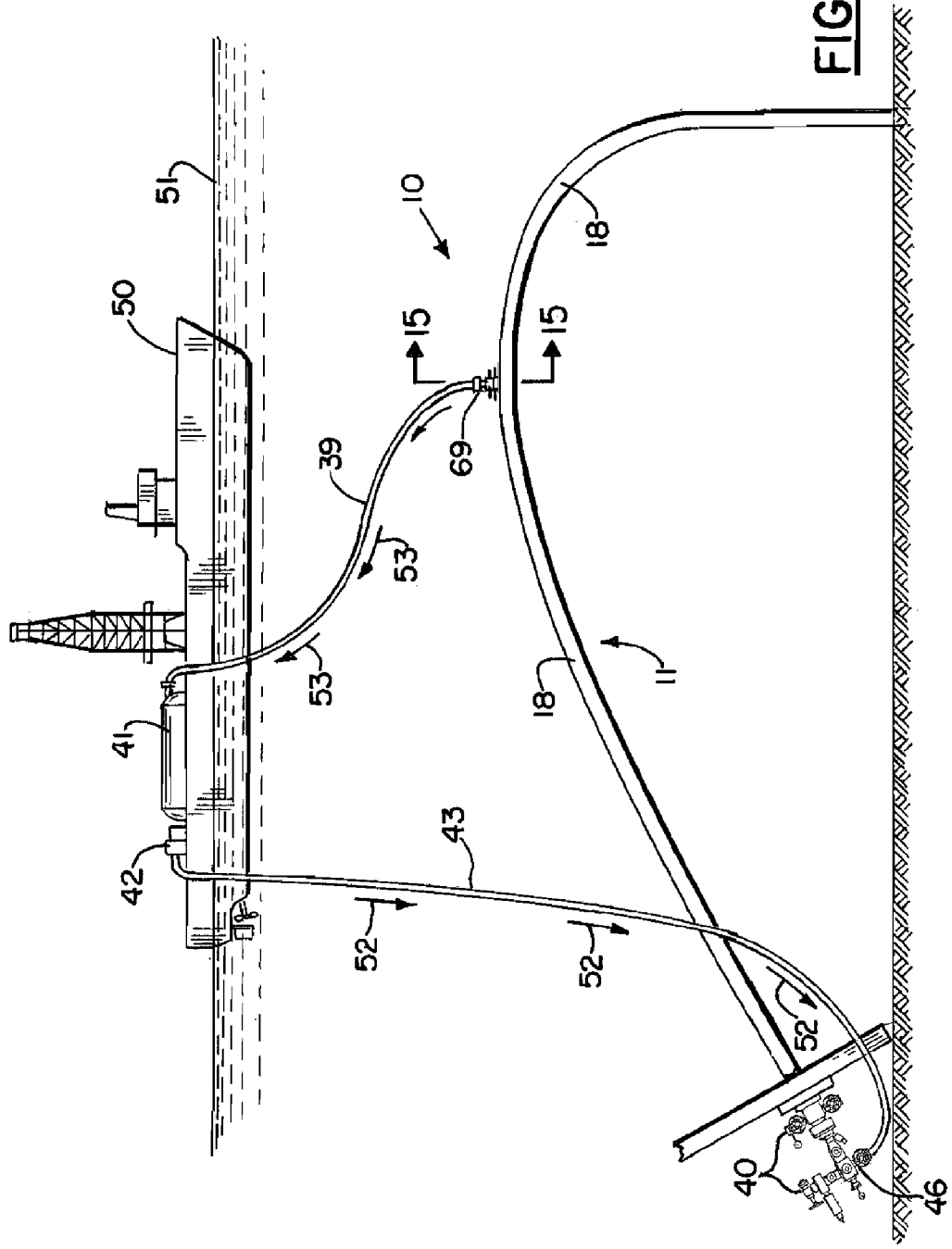
FIG. 16 is a schematic diagram illustrating use of a preferred embodiment of the apparatus of the present invention and showing the method of the present invention.

In FIG. 16, there can be seen an oil well/well tree designated generally by the numeral 40. Attached to the well tree 40 is a damaged or distressed set of nested tubulars 11. These nested tubulars 11 can be seen more clearly in the sectional view of FIG. 15 wherein there is a central production tubing or tubular 12. The central production tubing 12 can be surrounded by multiple casing sections such as the casing sections 14, 16, 18 as shown. The production tubing 12 provides a central bore 13 that is used to convey hydrocarbons to the surface when the well/well tree is operating.

Storms generate wind and wave action that cause damage to these nested tubulars 11. Tubulars 11 are often bent over to an inclined or generally horizontal position as shown in FIG. 16. While the production tubing 12 contains or can contain hydrocarbons under pressure, it is also possible that an annular space 15 in between the production tubing 12 and the first casing section 14 can also contain hydrocarbons under pressure.

The annular space 15 can contain hydrocarbons under pressure, as can the annular space 17 which is in between casing sections 14 and 16. Likewise, the annular space 19 in between casing sections 16 and 18 can also contain hydrocarbons under pressure.

In order to remove these hydrocarbons under pressure from the nested tubulars 11, the present invention provides a damaged well hydrocarbon evacuation system that is designated generally by the numeral 10 in FIGS. 1, 14-16. The damaged well hydrocarbon evacuation system 10 provides a mandrel 24 having a special configuration (see FIGS. 1, 8-9, 14-15) as will be described more fully hereinafter.

The mandrel 24 and a seal 23 are fitted to a plurality of drilled openings 20-22 that are cut through one or more of the casing sections 14, 16, 18, as seen in FIG. 15. In FIG. 15, the drilled opening 20 is formed in casing section 14. The drilled opening 21 is formed in the casing section 16. The drilled opening 22 is formed in the casing section 18. A drilled opening could also be formed in the production tubing 12. If the bore 13 of production tubing 12 is under pressure, a commercially available hot tapping tool can be used to cut an opening in the production tubing 12 for communicating with bore 13. Similarly, if the annular spaces 15, 17 and/or 19 are under pressure, a commercially available hot tapping tool can be used to cut the openings 20, 21, 22.

The mandrel 24 has a mandrel tapered section or taper 25 and a threaded section (e.g., external threads) 33. This tapered section 25 is surrounded by seal 23 (see FIGS. 1, 8-9, 14-15). The tapered section or taper 25 gradually increases the diameter of the mandrel 24 in a direction away from the externally threaded section 33 or external threads 33 of mandrel 24 as shown in FIGS. 1, 8, 9, 14-15.

Figure 1:
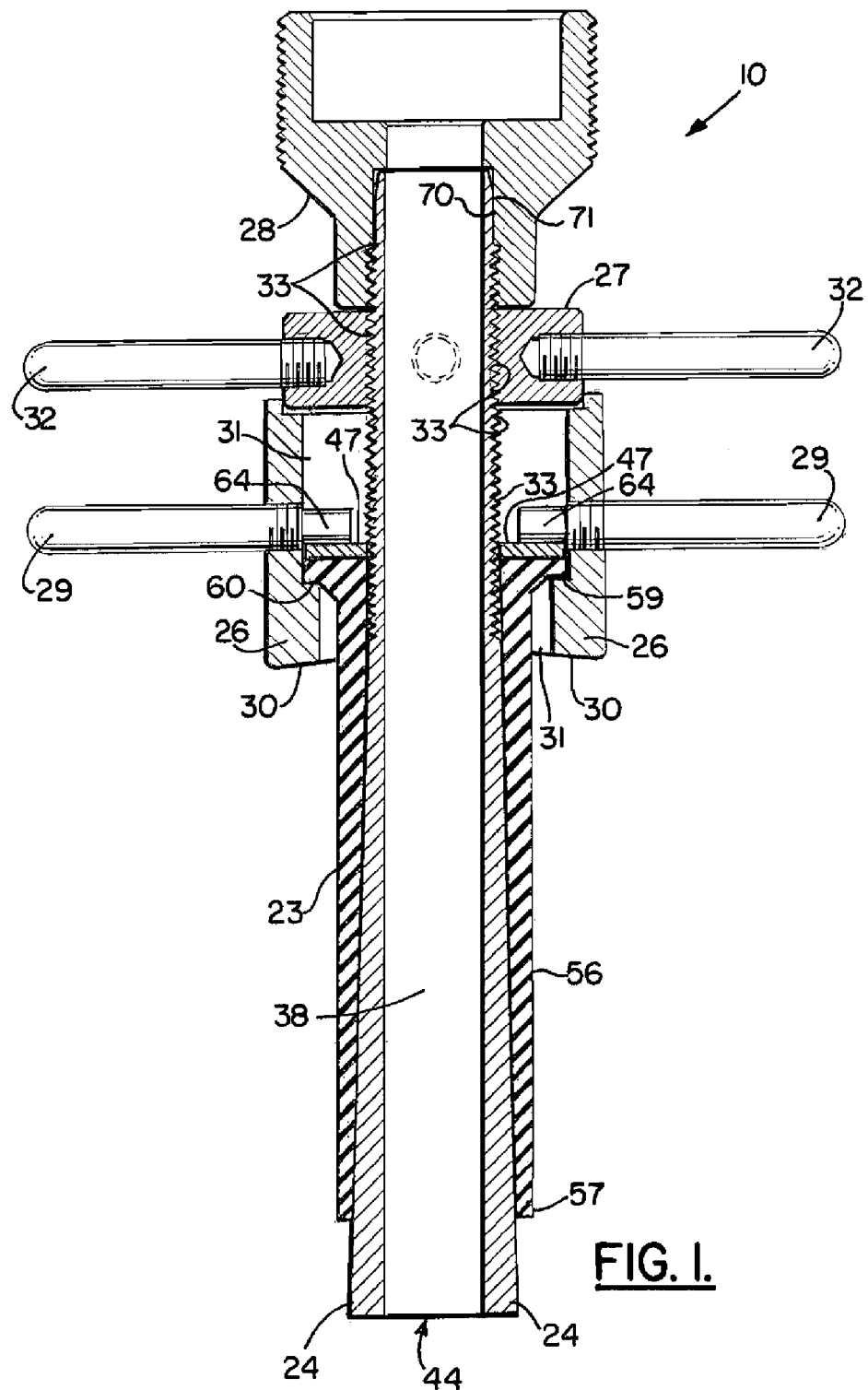
FIG. 1 is a longitudinal sectional view of a preferred embodiment of the apparatus of the present invention.

A saddle 26 (see FIGS. 1, 2-3, 14-15) is placed on the outermost casing 18 as shown in FIG. 15. A tension nut 27 (see FIGS. 1, 4-5, 14-15) is attached to the external threads 33 of mandrel 24 as shown in FIGS. 1, 4-5 and 14-15. A fitting 28 (see FIGS. 1, 12-15) is also attached to the threads 33 of mandrel 24 as shown in FIGS. 1 and 15. The fitting 28 can be a quick union such as a Bowen Quick Union (or BQU). Handles 29 can be provided on saddle 26 for enabling a user to manipulate the handles and thus the saddle 26. Saddle 26 has a surface 30 that is shaped to conform generally to the outer surface of outer casing section 18 as seen in FIGS. 1-3 and 14-15. For example, saddle 26 surface 30 can be concave to conform to the convex outer surface 73 of casing section 18. (See FIG. 15.) Saddle 26 provides a central opening 31 that enables the saddle 26 to fit over the seal 23 and mandrel 24 as shown in FIGS. 1, 13-15. Thus the seal 23, mandrel 24, and tapered section 25, and external threads 33 of mandrel 24 all fit inside saddle 26, occupying a part of central opening 31 as shown in FIGS. 1, 8-9, and 14-15.

Figure 14:
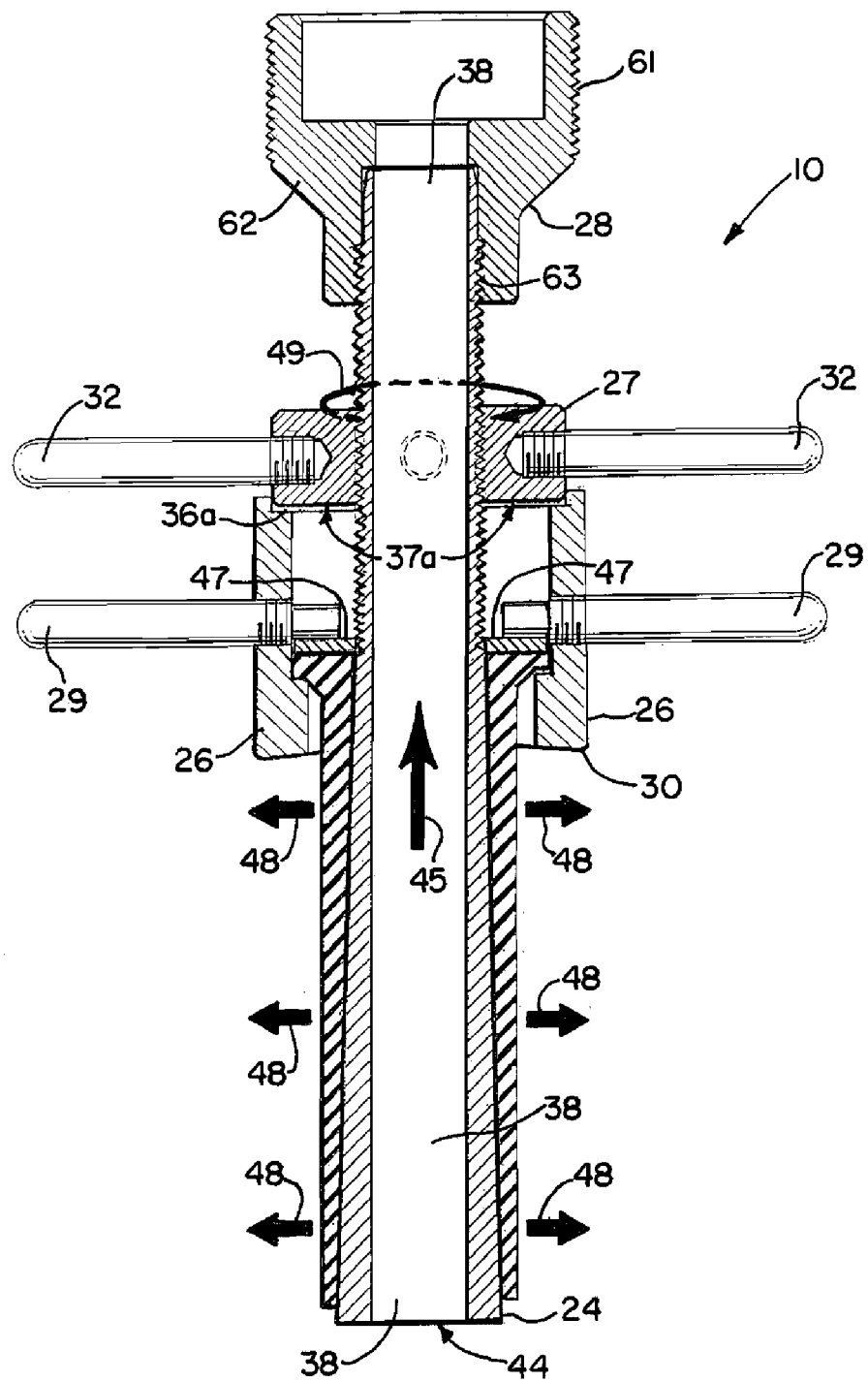
FIG. 14 is a sectional view of a preferred embodiment of the apparatus of the present invention.

Tension nut 27 provides one or more handles 32 for enabling a user to rotate the tension nut 27 (see arrow 49, FIG. 14). Tension nut 27 provides internal threads 34 that engage the external threads 33 of mandrel 24. Tension nut 27 internal threads 34 surround tension nut opening 35 (See FIGS. 4-5, 14-15).

Figure 2:
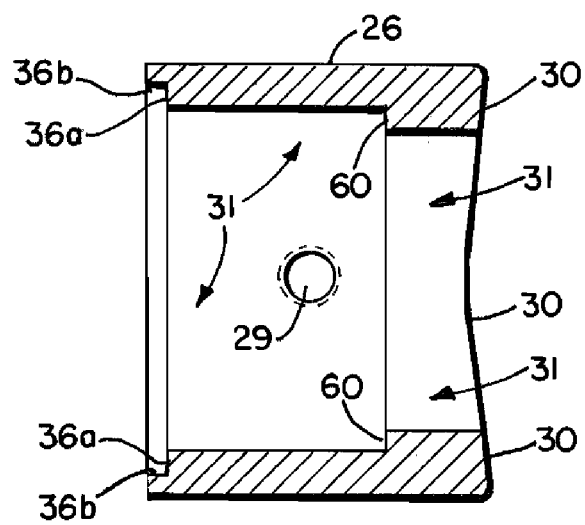
FIG. 2 is a partial sectional view of a preferred embodiment of the apparatus of the present invention.
Figure 3:
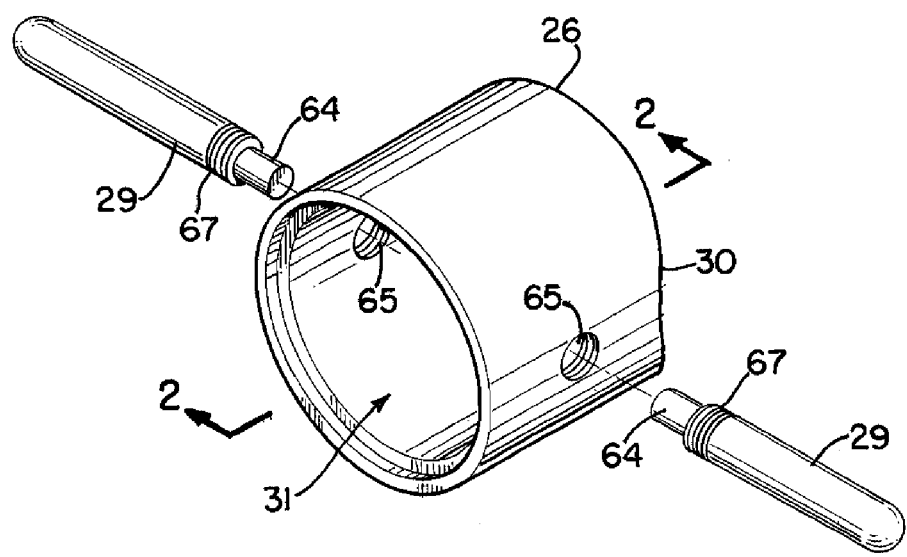
FIG. 3 is a partial perspective view of a preferred embodiment of the apparatus of the present invention.

In FIG. 2, saddle 26 provides annular faces 36a, 36b which can form an angle of about ninety degrees as shown. Similarly, the tension nut 27 provides annular faces 37a, 37b that can form an angle of about ninety degrees as shown in FIG. 5. The annular faces 36a, 37a engage as shown in FIGS. 1 and 14. In order to apply more or less pressure against the saddle 26, a user rotates the handles 32 and thus the tension nut 27. When the tension nut 27 is rotated in a direction that applies tension to the mandrel 24, this action also pulls mandrel 24 in the direction of arrow 45, applying outward pressure via mandrel 24 (see arrows 48) to seal 23 pressing the seal 23 against the casing sections 14, 16, 18 at the openings 22, 21, 20 (See FIGS. 14-15).

Mandrel 24 provides a bore 38 that communicates with fitting 28 and a return flow line 39 connected to fitting 28. An open end 44 of mandrel 24 enables an intake of hydrocarbons to be removed from the nested tubulars 11. Arrow 45 in FIG. 14 illustrates the direction of flow of oil that has been captured from the nested tubulars 11 for return to a surface tank 41 via flow line 39 (See FIGS. 14-16).

In order to remove the hydrocarbons from the nested tubulars 11, a pump 42 and pump flow line 43 are employed. A connection 46 is formed with well tree 40. During operation (see FIGS. 15, 16), pump 42 on vessel 50 pumps a selected fluid (for example, sea water) under pressure through flow line 43 to connection 46 and then to well tree 40 (see arrows 52, FIG. 16). This pressurized fluid pressurizes the well tree 40 and also the production tube 12 and/or any selected annular space 15, 17, or 19. The pressurized sea water or other fluid thus purges any hydrocarbons from the nested tubulars 11 to tank 41 via mandrel 24 bore 38 and flow line 39 to vessel 50 at water surface area 51 (see arrows 53, FIG. 16; see also FIGS. 14-15).

Figure 10:
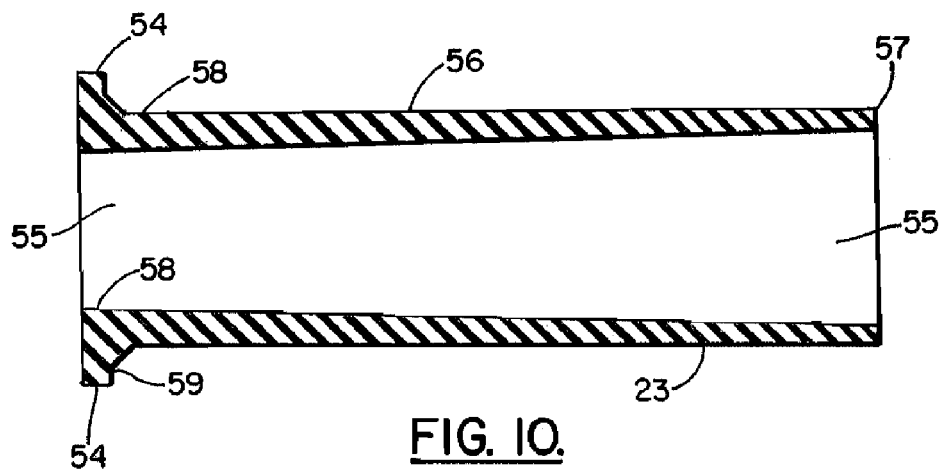
FIG. 10 is a partial sectional view of a preferred embodiment of the apparatus of the present invention.
Figure 11:
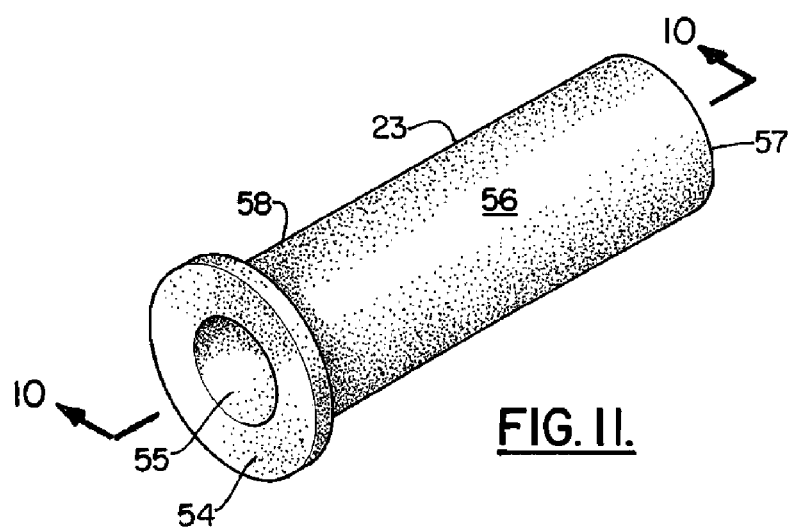
FIG. 11 is a partial perspective view of a preferred embodiment of the apparatus of the present invention.

FIGS. 10-11 show seal 23 in more detail. The seal 23 has a seal wall 56 of variable thickness as seen in FIG. 10. Wall 56 thus has a thinner end portion 57 and a thicker end portion 58. Wall 56 can provide a uniform taper (as shown in FIG. 10) between end portions 57 and 58. Annular flange 54 is provided on seal 23 at the thickened end portion 58. Flange 54 and wall 56 surround open ended bore 55 Annular surface 59 of flange 54 rests upon annular shoulder 60 of saddle 26 as seen in FIGS. 1 and 2 (see also FIG. 10).

Figure 12:
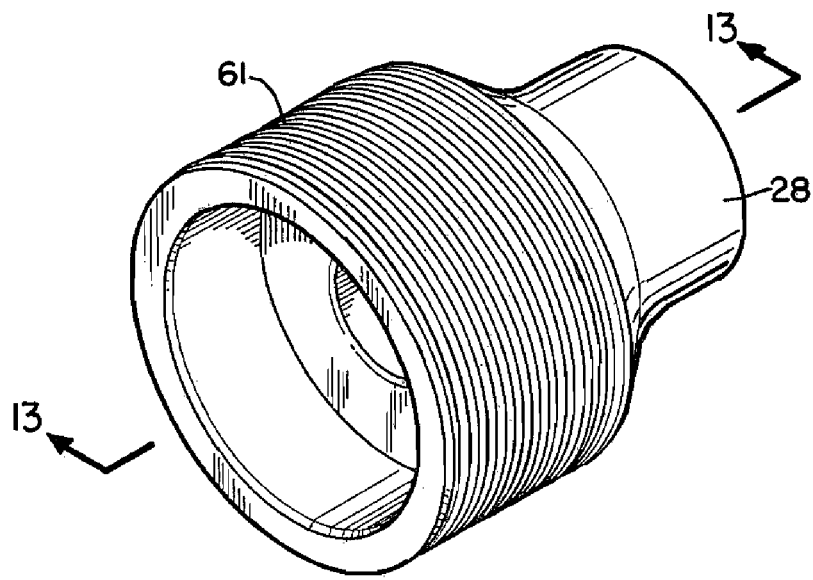
FIG. 12 is a partial perspective view of a preferred embodiment of the apparatus of the present invention.
Figure 13:
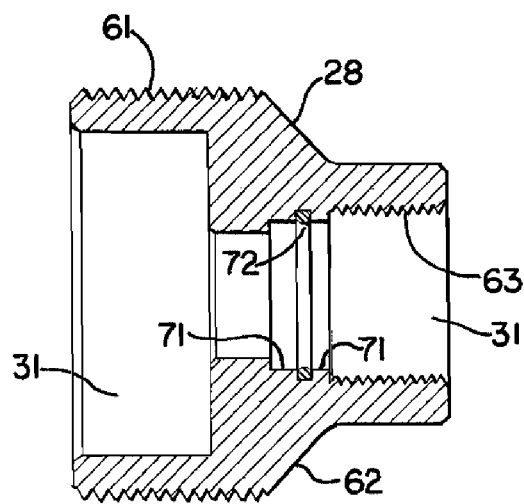
FIG. 13 is a sectional view taken alone lines 13-13 of FIG. 12.

In FIGS. 12-13, fitting 28 has externally threaded section 61 that enables a threaded connection to be formed with a union or fitting 69 at an end portion of return flow line 39 as seen in FIGS. 15-16. Fitting 28 has tapered section 62 and internally threaded portion 63 for connecting with threads 33 of mandrel 24 (see FIGS. 13-15).

Handles 29 have projecting portions 64 that press washer 47 against flange 54 as seen in FIGS. 1 and 14 (see also FIG. 10). Internally threaded openings 65 of saddle 26 enable a connection to be formed between externally threaded portions 67 of handles 29 and saddle 26 (see FIG. 3). Similarly, handles 32 each have an externally threaded portion 68 that enables each handle 32 to form a threaded connection with an internally threaded opening 66 on nut 27 (see FIGS. 4-7).

Mandrel 24 has an unthreaded portion 70 that fits a correspondingly shaped unthreaded portion 71 of fitting 28. An o-ring 72 can be provided at the joint of these unthreaded portions 70, 71 (see FIGS. 1, 9, 13).

The following is a list of parts and materials suitable for use in the present invention:

| PARTS LIST | |
| --- | --- |
| Parts Number | Description |
| 10 | damaged well hydrocarbon evacuation system |
| 11 | nested tubulars |
| 12 | production tubing |

-continued

| Parts Number | Description |
| --- | --- |
| 13 | bore |
| 14 | casing section |
| 15 | annular space |
| 16 | casing section |
| 17 | annular space |
| 18 | outer casing section |
| 19 | annular space |
| 20 | drilled opening |
| 21 | drilled opening |
| 22 | drilled opening |
| 23 | seal |
| 24 | mandrel |
| 25 | mandrel taper/tapered section |
| 26 | saddle |
| 27 | tension nut |
| 28 | fitting |
| 29 | handle |
| 30 | surface |
| 31 | central opening |
| 32 | handle |
| 33 | external threads/threaded section |
| 34 | internal threads |
| 35 | tension nut opening |
| 36a | annular face of saddle |
| 36b | annular face of saddle |
| 37a | annular face of tension nut |
| 37b | annular face of tension nut |
| 38 | mandrel bore |
| 39 | return flow line |
| 40 | oil well/well tree |
| 41 | tank |
| 42 | pump |
| 43 | flow line |
| 44 | open end |
| 45 | arrow |
| 46 | connection |
| 47 | washer/bearing |
| 48 | arrow |
| 49 | arrow |
| 50 | vessel |
| 51 | water surface area |
| 52 | arrow |
| 53 | arrow |
| 54 | annular flange |
| 55 | bore |
| 56 | seal wall |
| 57 | thinner end portion |
| 58 | thicker end portion |
| 59 | annular surface |
| 60 | annular shoulder |
| 61 | externally threaded section |
| 62 | tapered section |
| 63 | internally threaded portion |
| 64 | projecting portion |
| 65 | internally threaded opening |
| 66 | internally threaded opening |
| 67 | externally threaded portion |
| 68 | externally threaded portion |
| 69 | union/fitting |
| 70 | unthreaded portion/section |
| 71 | unthreaded portion/section |
| 72 | o-ring |
| 73 | convex outer surface |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A device that enables evacuation of hydrocarbons from a plurality of nested tubulars of an underwater well pipe extending from an underwater well tree, comprising:
    a) a first fluid transmission line attached to the underwater well tree, the fluid transmission line having one end portion forming an attachment to the tree and the other end portion attached to a pump that enables transmission of fluid under pressure to the tree and nested tubulars attached to the tree;
    b) one or more openings formed through one or more tubulars of the nested tubulars at a selected location;
    c) a fitting that seals the openings, the fitting having an expandable seal that is expandable responsive to rotation of a rotating member that rotates upon a saddle, the saddle surrounding a mandrel and bearing against an outer tubular of the nested tubulars;
    d) wherein the fitting has a bore and enabling hydrocarbons to escape from the tubulars via the bore;
    e) a second fluid transmission line attached to the fitting; and
    f) a collection vessel that receives hydrocarbons from the second fluid transmission line.

2. The device of claim 1 wherein the fitting surrounds the mandrel and the mandrel has a tapered section that slides relative to the seal.

3. The device of claim 2 wherein the mandrel has an externally threaded portion and the rotating member is an internally threaded nut that engages said externally threaded portion of the mandrel.

4. The device of claim 3 wherein the threaded nut has one or more handles and the nut is rotated by rotating one or more handles.

5. The device of claim 1 wherein the nested tubulars include a production flow line.

6. The device of claim 5 wherein the nested tubulars include one or more casing sections surrounding the production flow line.

7. The device of claim 1 wherein the fitting has a flow bore and a flow opening through which pressurized fluids can flow and wherein the seal contains pressurized fluid up to about 5,000 p.s.i. (34,474 kPa).

8. The device of claim 1 wherein the seal is of a rubber or rubber like material.

9. The device of claim 1 wherein the nested tubulars include a central production flow line, a first casing surrounding the production flow line and a second casing surrounding the first casing and wherein there is a first annulus in between the production flow line and the first casing and a second annulus in between the first casing and the second casing, wherein each annulus is pressurized.

10. An apparatus that enables evacuation of hydrocarbons from a damaged assembly of nested tubulars and an underwater well tree of an underwater oil well, comprising:
    a) a fluid transmission line attached to the underwater well tree, the fluid transmission line having one end portion forming said attachment to the tree and the other end portion attached to a pump that enables a working fluid under pressure to be transmitted to the assembly of tree and nested tubulars;
    b) openings through one or more tubulars of the nested tubulars at a selected location;
    c) a fitting attached to the tubulars that seals the openings, said fitting having a flow bore;
    d) a return flowline through which the hydrocarbons escape from the tubulars via the bore as the working fluid is pumped to the assembly of tree and nested tubulars.

11. The apparatus of claim 10 wherein the fitting includes a tapered mandrel and a seal member, and wherein the tapered mandrel expands the seal member to seal said openings.

12. The apparatus of claim 11 wherein the mandrel has a bore and the hydrocarbons exit via the mandrel bore.

13. The apparatus of claim 11 wherein the fitting surrounds the mandrel and the mandrel has a tapered section that moves relative to the seal.

14. The apparatus of claim 11 wherein the mandrel has an externally threaded portion and a rotating member is an internally threaded nut that engages said externally threaded portion of the mandrel.

15. The apparatus of claim 14 wherein the threaded nut has one or more handles for rotating the nut by rotating one or more handles.

16. The apparatus of claim 10 further comprising providing a storage tank and transmitting the hydrocarbons to the storage tank via a flow line that connects between the fitting and the storage tank.

17. The apparatus of claim 16 further comprising providing a vessel and the storage tank is on the vessel.

18. The apparatus of claim 10 further comprising providing a vessel and the pump is on the vessel.

19. The apparatus of claim 10 wherein the nested tubulars include a production flow line.

20. The apparatus of claim 19 wherein the nested tubulars include multiple casing sections surrounding the production flow line.

21. The apparatus of claim 10 wherein the fitting has a flow bore and a flow opening through which pressurized fluids can flow and wherein the seal contains pressurized fluid up to about 5,000 p.s.i. (34,474 kPa).

22. The apparatus of claim 10 wherein the return flow line transmits the escaping hydrocarbons to a collection tank.

23. The apparatus of claim 10 wherein the nested tubulars include a central production flow line, a first casing surrounding the production flow line and a second casing surrounding the first casing and wherein there is a first annulus in between the production flow line and the first casing and a second annulus in between the first casing and the second casing, wherein each annulus is pressurized.

24. The apparatus of claim 10 wherein the fitting is of a rubber or rubber like material.

\* \* \* \* \*